Aug. 23, 1927.
J. H. SENNETT
1,640,220
PIPE WELDING PLANT
Filed June 23, 1923
2 Sheets-Sheet 1
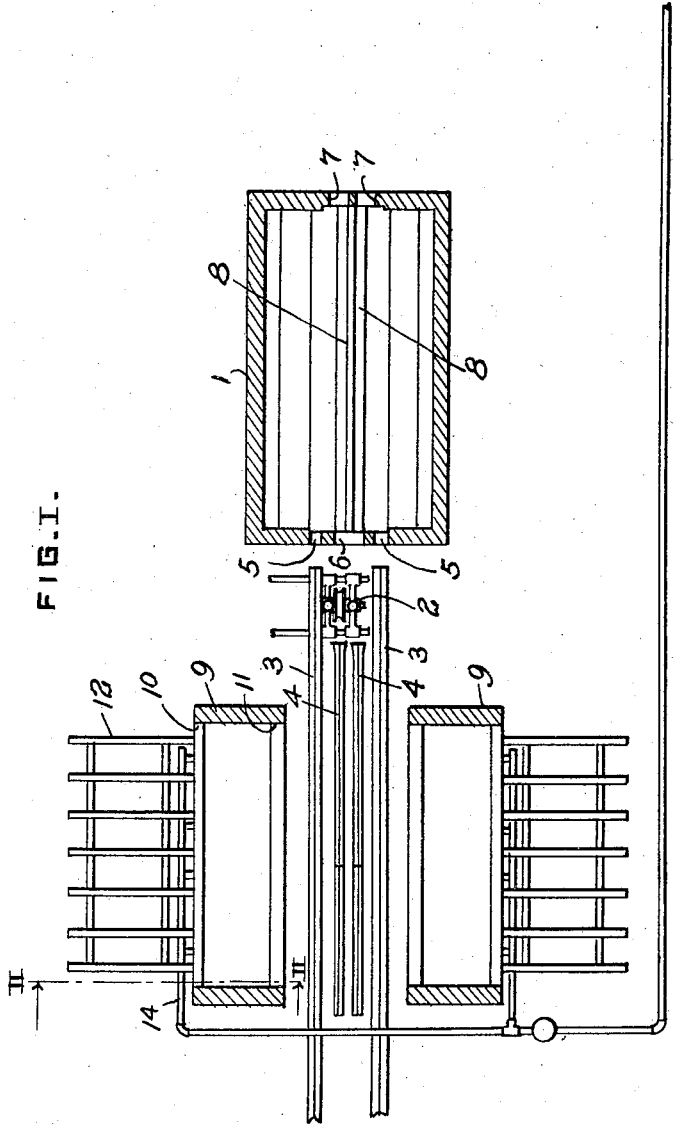
WITNESSES
INVENTOR
John H. Sennett
by Christy and Christy
his attorneys

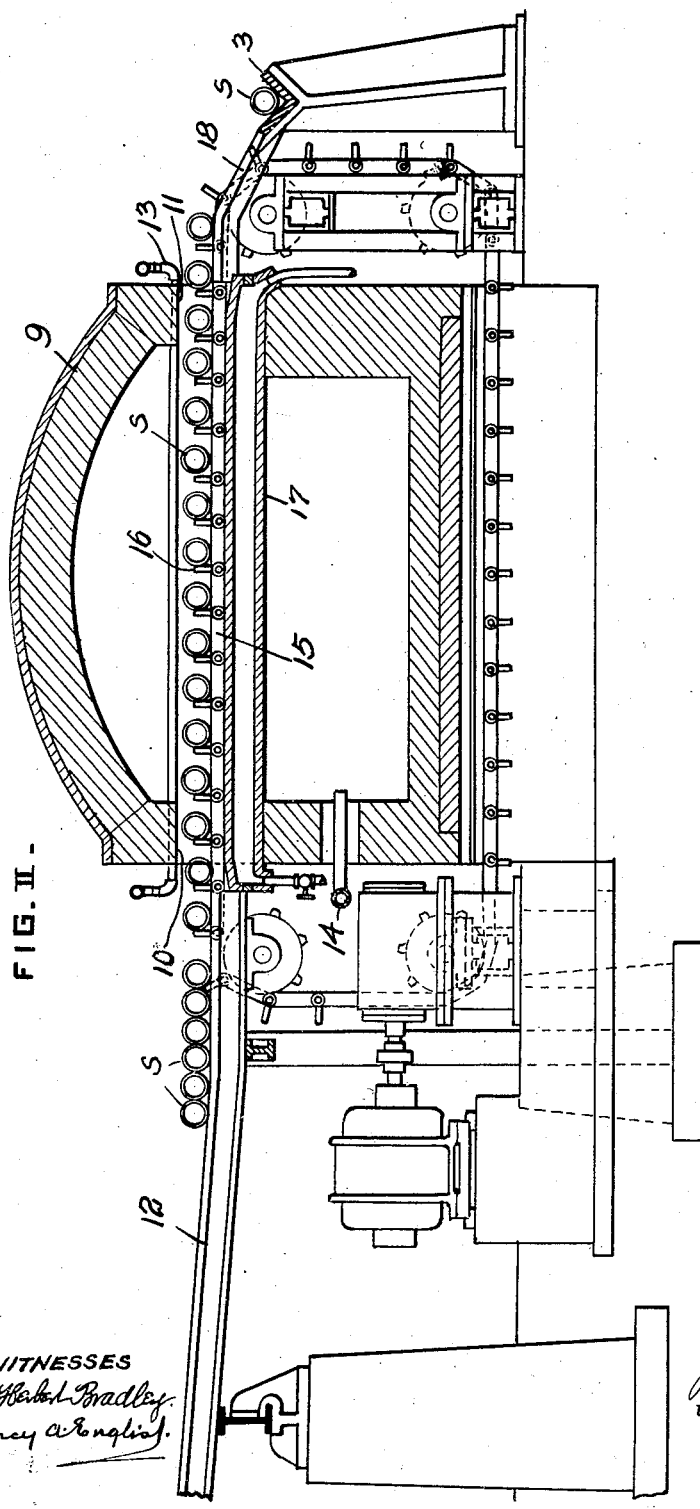

Patented Aug. 23, 1927.

1,640,220

UNITED STATES PATENT OFFICE.

JOHN H. SENNETT, OF WOODLAWN, PENNSYLVANIA, ASSIGNOR TO JONES & LAUGHLIN STEEL CORPORATION, OF PITTSBURGH, PENNSYLVANIA, A CORPORATION OF PENNSYLVANIA.

PIPE-WELDING PLANT.

Application filed June 23, 1923. Serial No. 647,313.

My invention relates to improvements in plants for making welded pipe and in methods of operation of such plants. In an application for Letters Patent of the United States, filed December 11, 1920, Serial No. 429,853, in which I am one of the joint applicants, a plan for welding pipe is shown and described. It is in the plant of that application that I have developed and embodied my present invention, and in such embodiment I shall here describe it. This is a plant for making lap-weld steel pipe. It will be understood that the invention may be embodied generally in the building of plants in which bent skelp is heated and welded. The object in view is economy in operation.

In the accompanying drawings Fig. I is a view in plan of a pipe making plant in which my present invention is embodied. Fig. II is a view to larger scale, showing in vertical and transverse section the furnace which is a new element in the organization of the plant and whose introduction and coordination with other elements constitutes my present invention. The plane of section of Fig. II is indicated by the line II—II, Fig. I.

Referring first to Fig. I, 1 is a welding furnace and 2 is a welding machine; 3 are troughs through which bent skelp is advanced and introduced into the welding furnace, and 4 are troughs through which the welded pipe is delivered from the welding machine. 5 are the charging openings of the welding furnace, 6 the delivery opening, and 7 the openings in the opposite and remote furnace wall, through which workmen have access, for moving the skelp upon the furnace floor, and through which pushing apparatus, if such apparatus be desired, may enter, to drive the skelp individually when heated from the welding furnace through the delivery opening 6 to the welding machine 2. There are two gutters 8 in the floor of the furnace, and into these gutters the skelp under treatment is eventually advanced and from them the skelp is pushed to the welding machine. The two delivery troughs 4 are aligned with the gutters 8 and the delivery opening 6 in the furnace wall is wide enough to allow free passage of the skelp between. The welding machine is movable laterally to alignment with either gutter and its corresponding delivery trough.

In operation the bent skelp are advanced on either side one by one in troughs 3 through charging openings 5 and into the welding furnace. Within the furnace the skelp is heated, and as it is heated, attendants, termed "turners down" standing in the "pit" at the remote end of the furnace,— the right-hand end, Fig. I—reach in, through openings 7 and with suitable tools roll the skelp upon the furnace floor and bring it ultimately to place in the gutters 8. Along gutters 8 the heated skelp is pushed, manually or by a mechanical pusher, first along one gutter, then along the other, through the opening 6 and into the welding machine. There the pipe is welded. From the welding machine the welded pipe advances along troughs 4.

Further minute description of other features of this particular plant are not important to a description of my present invention. They may however be found, set forth in the specification above alluded to.

As described in that earlier application, the bent skelp are advanced sidewise over skids to position in the charging troughs.

The care and attention required by the skelp within furnace 1 is great. The temperature to which the skelp must within the welding furnace be brought is about 2,400° F. and that is a temperature far too high to admit of any mechanical apparatus for dealing with the skelp within the furnace,—rolling them and advancing them to gutters 8. It accordingly is necessary that the welding furnace be tended and that the skelp within be advanced manually. The "turning down" must be done by hand.

I have perceived, and from this perception springs my invention, that it is only as the skelp approaches welding heat, that is to say, it is only with the higher ranges of the elevated temperature attained that the attention of the turner down is required. And based upon this perception, my invention consists in cutting in two the skelp-heating operation, and in providing two heating furnaces. In one of the two furnaces the skelp is heated only to such degree as is not prohibitive of the use of mechanical conveying apparatus, while in the other furnace, which receives from the first the partially heated skelp, heating is completed under manual attention.

Referring still to Fig. I of the drawings, my invention consists in providing two auxiliary furnaces 9, with charging openings 10 on one side and delivery openings 11 upon the other side, into which bent skelp pass sidewise from skidways 12 and from which they pass sidewise to the troughs 3 which feed the furnace 1. These two furnaces 9 are symmetrically arranged one on either side of the mid-line of the welding furnace 1.

Fig. II shows one of the two duplicate and complementarily arranged furnaces 9 in detail. It will be seen to be a furnace of simple rectangular shape with vaulted roof and long side openings. Suitable heating means are indicated in gas pipes 13 and 14.

An endless chain conveyor 15 equipped with skelp-engaging fingers 16, advancing, automatically picks up the skelp one by one from the skidway 12, gradually advances them through the furnace chamber and delivers them one by one to the trough 3. The skelp are indicated by the letter *s*. Proper means may be provided for protecting the conveyor if need be from excessive heat as by the provision of a water-cooled conveyor skid 17, over which the reach of the conveyor 15 within the furnace chamber passes. The temperature control is such, and the speed of conveyor travel is such, that within the furnace 9 the skelp may be raised to a temperature of say 1200° to 1400° F., a temperature range which is not so high, but that it is entirely possible and practicable to operate within the furnace a mechanical conveyor such as that which is illustrated in Figure II.

The so preheated skelp, passing from the furnace 9 and delivered automatically over an incline 18 to the trough 3, is immediately and without any substantial loss of heat carried along trough 3 into the welding furnace 1. There within the welding furnace 1 the regular normal operation is conducted with this modification, that now the attendant who takes care of the skelp within the welding furnace has to take care of it through a much narrower range of temperature, and through a much shorter interval of time, and while the speed of production continues undiminished he has a very much diminished number of skelp under his care at any particular instant of time. Proportionately as the number of skelp to be handled within furnace 1 is reduced and the operation within furnace 1 simplified, the number of attendants may be reduced, and the work which previously had to be done wholly manually, is in part accomplished by the mechanical conveyor in the auxiliary furnaces 9. Herein and in consequence hereof there is a very substantial saving in cost of production, and an improvement in the economy and efficiency of the plant as a whole.

As I said at the beginning, I here show and describe my invention in its application to a pipe-welding plant of a particular construction and arrangement. Manifestly it is applicable in any plant where bent skelp has to be raised to welding temperature.

I claim as my invention:

1. In a pipe welding plant the combination of a welding machine, a welding furnace provided with a turn-down opening adapted to deliver heated skelp to said welding machine, a preheating furnace adapted to receive bent skelp and to heat the received skelp to a temperature somewhat less than welding temperature, and means for conveying skelp in substantially direct course through said preheating furnace and into said welding furnace.

2. In a pipe welding plant the combination of a welding machine, a welding furnace provided with a turn-down opening adapted to deliver heated skelp to said welding machine, a preheating furnace adapted to receive bent skelp and to heat the received skelp to a temperature somewhat less than welding temperature, means for conveying in substantially direct course from said preheating furnace and for charging into said welding furnace skelp delivered from said preheating furnace, and means for conveying skelp in continuous course through said preheating furnace and to the first-named conveying means.

3. In the production of welded pipe the method herein described which consists in heating bent skelp to a temperature approximating the limit of mechanical conveyance, mechanically conveying the so-heated skelp to the welding furnace, and completing in the welding furnace the heating of the skelp to welding temperature.

In testimony whereof I have hereunto set my hand.

JOHN H. SENNETT.